(12) United States Patent
Guim Bernat et al.

(10) Patent No.: US 11,329,898 B2
(45) Date of Patent: *May 10, 2022

(54) TECHNIQUES TO CONTROL QUALITY OF SERVICE FOR END-TO-END PATHS IN A COMPUTE ENVIRONMENT

(71) Applicant: INTEL CORPORATION, Santa Clara, CA (US)

(72) Inventors: Francesc Guim Bernat, Barcelona (ES); Kshitij A. Doshi, Tempe, AZ (US); Daniel Rivas Barragan, Cologne (DE); Mark A. Schmisseur, Phoenix, AZ (US); Steen Larsen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,703

(22) Filed: Mar. 16, 2021

(65) Prior Publication Data
US 2021/0273863 A1    Sep. 2, 2021

Related U.S. Application Data

(63) Continuation of application No. 15/279,375, filed on Sep. 28, 2016, now Pat. No. 10,992,550.

(51) Int. Cl.
*G06F 15/173* (2006.01)
*H04L 41/5025* (2022.01)
*H04L 43/0817* (2022.01)
*H04L 43/16* (2022.01)
*H04L 41/0896* (2022.01)

(52) U.S. Cl.
CPC ...... *H04L 41/5025* (2013.01); *H04L 41/0896* (2013.01); *H04L 43/0817* (2013.01); *H04L 43/16* (2013.01)

(58) Field of Classification Search
CPC ............. H04L 41/5025; H04L 41/0896; H04L 43/0817; H04L 43/16
USPC ....................................................... 709/224
See application file for complete search history.

(56) References Cited

U.S. PATENT DOCUMENTS

| | | | | |
|---|---|---|---|---|
| 2008/0317060 A1* | 12/2008 | Balasaygun | ........ | H04L 67/1012 370/437 |
| 2017/0187805 A1* | 6/2017 | Guim Bernet | ...... | G06F 12/0811 |
| 2019/0335018 A1* | 10/2019 | Supramaniam | ......... | H04L 63/08 |

* cited by examiner

*Primary Examiner* — Alan S Chou
(74) *Attorney, Agent, or Firm* — KDB Firm PLLC

(57) ABSTRACT

Embodiments may be generally directed to techniques to cause communication of a registration request between a first end-point and a second end-point of an end-to-end path, the registration request to establish resource load monitoring for one or more resources of the end-to-end path, receive one or more acknowledgements indicating resource loads for each of the one or more resources of the end-to-end path, at least one of the acknowledgements to indicate a resource of the one or more resources is not meeting a threshold requirement for the end-to-end path, and perform an action for communication traffic utilizing the one or more resources based on the acknowledgement.

26 Claims, 10 Drawing Sheets

TECHNIQUES TO CONTROL QUALITY OF SERVICE FOR END-TO-END PATHS IN A COMPUTE ENVIRONMENT

CROSS-REFERENCE TO RELATED APPLICATIONS

This application is a continuation of, claims the benefit of and priority to previously filed U.S. patent application Ser. No. 15/279,375 filed Sep. 28, 2016, entitled "TECHNIQUES TO CONTROL QUALITY OF SERVICE FOR END-TO-END PATHS IN A COMPUTE ENVIRONMENT", which is hereby incorporated by reference in its entirety.

TECHNICAL FIELD

Embodiments described herein generally relate to controlling quality of service for end-to-end paths in a compute environment. Specifically, embodiments include performing resource monitoring for one or more resources of the end-to-end path to ensure quality of service requirements.

BACKGROUND

Many modern applications have demanding resource requirements that are difficult to support and scale. An effective way to scale such applications is to distribute individual tasks onto different processing elements and interconnect those processing elements on a switch fabric. This arrangement may support the high-bandwidth data flows that must exist between the tasks for the applications.

A high performance switch fabric arrangement may be achieved by use of various proprietary multi-stage switching technologies, but the performance is achieved at a high cost in dollars and in features, such as scalability. In order to achieve high performance at a reasonable cost, current approaches include sharing resources between applications. However, usage of these resources must be controlled to ensure that quality of service requirements for each of the applications is being met.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1A:
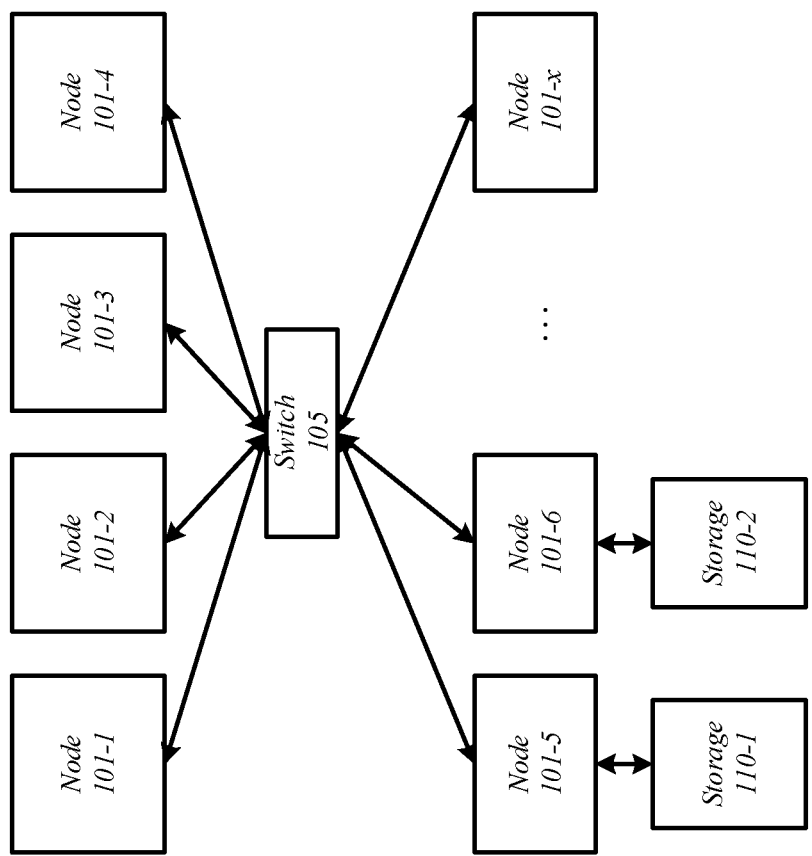
FIG. 1A illustrates an example of a system.

Various embodiments discussed herein may include methods, apparatuses, devices, and systems to control Quality of Service (QoS) requirements for applications processed in a distributed processing environment including processing elements coupled via a switch fabric. Most distributed environments, including Intel's® Stormlake®, provide QoS features to guarantee a given overall performance of resources of the distributed environment. QoS is particularly important in some applications with special requirements in latency or bandwidth, for example.

However, today's most common QoS algorithms tend to be either too relaxed or too conservative when processing in real-time because there is no way to anticipate which algorithm or approach to apply ahead of time. Typical solutions are based on best effort (no QoS), differentiated resource utilization (prioritizing resource utilization), and guaranteed resource utilization. Best effort and differentiated resource utilization tend to be too relaxed for some applications, while guaranteed resource utilization is typically not needed most of the time causing resources to go under-utilized. Embodiments discussed herein solve these problems in real-time application processing to get maximum resource utilization out of the resources of an environment without compromising the QoS requirements of applications.

In one particular example, embodiments may include performing resource monitoring for end-to-ends path for processing in the distributed environment. For example, resource monitoring for a particular application may be established by logic causing communication of a registration request between a first end-point and a second end-point of the end-to-end path. The registration request may be used to establish resource load monitoring for one or more resources of the end-to-end path, such as processing resources, memory resources, networking resources, and software resources of a sending node, a destination node, and one or more switches.

In some embodiments, the logic may include receiving one or more acknowledgements indicating resource loads for each of the one or more resources of the end-to-end path. In some instances, at least one of the acknowledgements may indicate that a resource of the one or more resources is not meeting a threshold requirement for the end-to-end path, e.g. QoS requirements are not being met. Thus, embodiments include performing an action for communication traffic utilizing the one or more resources based on the acknowledgement. The action may include changing resource utilization for the application on the resource not meeting the QoS requirements. Embodiments are not limited in this manner and these, and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of a system 100 which may be part of a data-center or supercomputer array. The system 100 may include one or more nodes 101-$x$, where x may be any positive integer, that are coupled by one or more switches 105 to provide networking and fabric interconnection capabilities. The nodes 101 or end-points are capable of providing services, such as networking services, processing services, computational services, storage services, and so forth. For example, node 101-5 is coupled with storage system 110-1 and node 101-6 is coupled with storage system 110-2. These nodes 101-5 and 101-6 may provide storages services and are capable of storing information and data on the storage system 110-1 and 110-2.

A storage system 110 may include one or more aggregate storage clusters having one or more storage devices which may be configured in a redundant array of independent disks (RAID) configuration. In various embodiments, a storage system 110 may be a clustered storage system in a storage area network (SAN) environment or a network attached storage (NAS).

In embodiments, the nodes 101 may be coupled by switch 105, which may be part of a high speed fabric architecture, such as Intel's® Onmi-Path Architecture® that is capable of communicating at one hundred (100) gigabits-per-second (Gb/sec) speeds for each link coupling the nodes 101. The switch 105 is typically a Layer 2 device and acts as a packet forwarding mechanism within a fabric, for example. The switch 105 may be centrally provisioned and managed by fabric management software, and each switch 105 may include a management agent to respond to management transactions. In some instances, the switch 105 is responsible for executing Quality of Service (QoS) features such as congestion management functions and bandwidth reserving. These and other details will become more apparent in the following description.

Figure 1B:
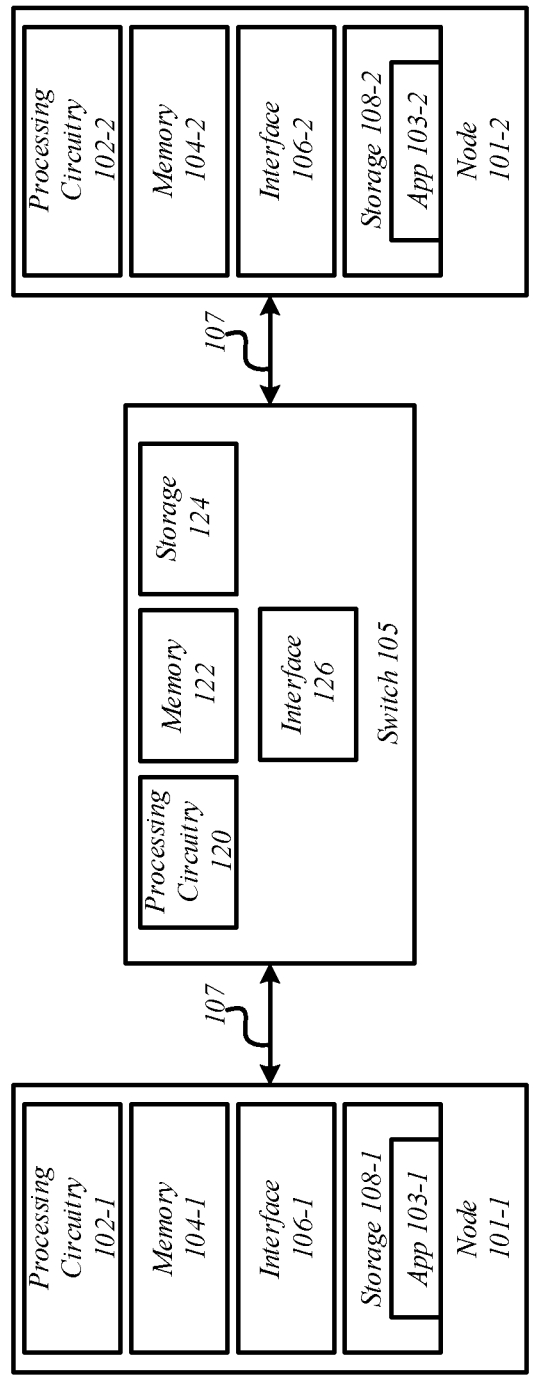
FIG. 1B illustrates an example of a system.

FIG. 1B/1C illustrates examples of system 125 and system 150 which may be similar to system 100 and may be part a data-center or supercomputer array. The illustrated system 125 includes two nodes 101-1 and 101-2 coupled via the switch 105 and links 107. System 150 illustrates two nodes 101-1 and 101-2 coupled via a number of switches 105-a, where a may be any positive integer, via one or more links 107.

Each of the nodes 101 may include resources, such as processing circuitry 102, memory 104, one or more interfaces 106, and storage 108. In some instances, the resources monitored may include software resources, such as database software, operating system software, networking software, and so forth. Each of the nodes 101 may also include one or more applications 103 that utilize one or more resources provided by the nodes 101 and switches 105. The switch 105 may also include resources, such as processing circuitry 120, memory 122, storage 124, one or more interfaces 126, and software resources.

In some embodiments, the processing circuitry 102 may include logic and may be one or more of any type of computational element, such as but not limited to, a microprocessor, a processor, central processing unit, digital signal processing unit, dual core processor, a multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a field-programmable gate array (FPGA) circuit, or any other type of processor or processing circuit on a single chip or integrated circuit. The processing circuitry 102 may be connected to and communicate with the other elements of the node 101 via interconnects (now shown), such as one or more buses, control lines, and data lines. In some embodiments, the processing circuitry 102 may include processor registers or a small amount of storage available the processing units to store information including instructions that and can be accessed during execution. Moreover, processor registers are normally at the top of the memory hierarchy, and provide the fastest way to access data.

Each node 101 also includes memory 104 to store information. Further, memory 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 104 can store data momentarily, temporarily, or permanently. The memory 104 stores instructions and data for a node 101. The memory 104 may also store temporary variables or other intermediate information while the processing circuitry 102 is executing instructions. In some embodiments, information and data may be loaded from memory 104 into the computing registers during processing of instructions. Manipulated data is then often stored back in memory 104, either by the same instruction or a subsequent one. The memory 104 is not limited to storing the above discussed data; the memory 104 may store any type of data.

A node 101 also includes one or more interfaces 106 such as any device and circuitry for processing information or communications over wireless and wired connections. For example, the one or more interfaces 106 may include a receiver, a transmitter, one or more antennas, and one or more Ethernet connections. The specific design and implementation of the one or more network interfaces 106 may be dependent upon the communications network in which the system 100 intended to operate. In some embodiments, the one or more interfaces 106 may be a host fabric interface (HFI). An HFI may include logic to implement the physical and link layers, such that a node 101 can attach to a fabric, via switch 105 for example, and send and receive packets to other servers, devices and nodes 101. HFIs include the appropriate hardware interfaces and drivers for operating system and VMM (Virtual Machine Manager) support. An HFI may also include specialized logic for executing or accelerating upper layer protocols and/or offload of transport protocols. An HFI also includes logic to respond to messages from network management components. In some instances, each node 101 may be connected to the architecture fabric via an HFI.

As mentioned, each node 101 may be coupled with the switch 105 via one or more links 107. The links 107 can be full-duplex, point-to-point interconnects that connect HFIs to the switches 105-a, switches 105-a to other switches 105-a, or switches 105-a to gateways (not shown). Links 107 may have different physical configurations, in circuit board traces, copper cables, or optical cables. In one embodiment the implementations of the PHY (Physical layer), cable, and connector strategy is to follow those for Ethernet, specifically 100 GbE (100 gigabits per second Ethernet, such as the Ethernet links defined in IEEE 802.3bj draft standard (current draft 2.2)). The architecture is flexible, supporting use of future Ethernet or other link technologies that may exceed 100 GbE bandwidth. High-end supercomputer products may use special-purpose (much higher bandwidth) PHYs, and for these configurations interoperability with architecture products will be based on switches with ports with differing PHYs.

The system 100 may include storage 108 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 108 may include technology to increase the storage performance enhanced protection for valuable digital media when multiple hard drives are included, for example. Further examples of storage 108 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Further, the storage 108 may include instructions that may cause information to be temporarily stored in memory 104 and processed by processing circuitry 102. More specifically, the storage 108 may include one or more operating systems (OS), one or more virtual environments, and one or more applications.

In embodiments, the one or more operating systems, may be any type of operating system such as Android® based on operating system, Apple iOS® based operating system, Symbian® based operating system, Blackberry OS® based operating system, Windows OS® based operating system, Palm OS® based operating system, Linux® based operating system, FreeBSD® based operating system, and so forth. The operating system may enable other virtual environments and applications to operate.

The storage 108 may also include one or more applications 103 to process information and data. An application 103 may be any type of application including, but not limited to, data processing applications, storage applications, banking applications, finance applications, word processing applications, database applications, storage applications, spreadsheet applications multimedia applications, compute system applications, presentation applications, business applications, and so forth.

In embodiments, an application 103 may include QoS requirements defining given overall performance requirements for resources. The QoS requirements are particularly important in some applications 103 with special requirements for latency and bandwidth, for example. Other requirements of resources for applications 103 may include processing and memory bandwidth to process and handle information. These requirements may apply to the node 101 including the application 103, e.g. in storage 108, nodes 101 utilized by the application 103, and fabric devices, e.g. switch 105, to couple the nodes 101.

FIG. 1B illustrates node 101-1 including application 103-1. In the illustrated example, the application 103-1 may utilize node 101-2 and application 103-2 for processing capabilities. The application 103-1 may have resource QoS requirements for the resources of node 101-1, switch 105, and node 101-2 creating an end-to-end path. These resources can include the processing circuitries 102-1, 120, and 102-2, the memories 104-1, 122, and 104-2, the interfaces 106-1, 106-2, and 126, and storage 108-1, 124, and 108-2. These requirements may be based on the needs of the application 103-1 and determined by logic as part of a software stack and processing circuitry. In some instances, the requirements may be specified in a Service Level Agreement (SLA) for the application 103-1. Embodiments are not limited to these examples.

Typical QoS algorithms tend to be either too relaxed or too conservative. Examples of current solutions that are too relaxed including "Best Effort" having no QoS and "Differentiated Traffic" where some traffic that is considered more important than other traffic is prioritized. These solutions may not meet the needs of applications that have specific performance requirements during high utilization times. On the other hand, a conservative solution, such as "Guaranteed Bandwidth" that reserves resource usage, may leave under-utilize resources during low usage times. Thus, embodiments discussed herein may be directed to an intermediate solution to provide maximum resource utilization while not compromising QoS requirements for applications.

Embodiments discussed herein may include establishing resource monitoring and QoS management for one or more applications utilizing one or more end-to-end paths having resources for processing capabilities. The resource monitoring includes registering one or more resources utilized by a particular application to monitor, monitoring the registered resources, and performing corrective actions when required. The resource monitoring and QoS management occur in real-time and dynamically while information and data are processed by the systems. These and other details will become more apparent in the following description.

Figure 2A:
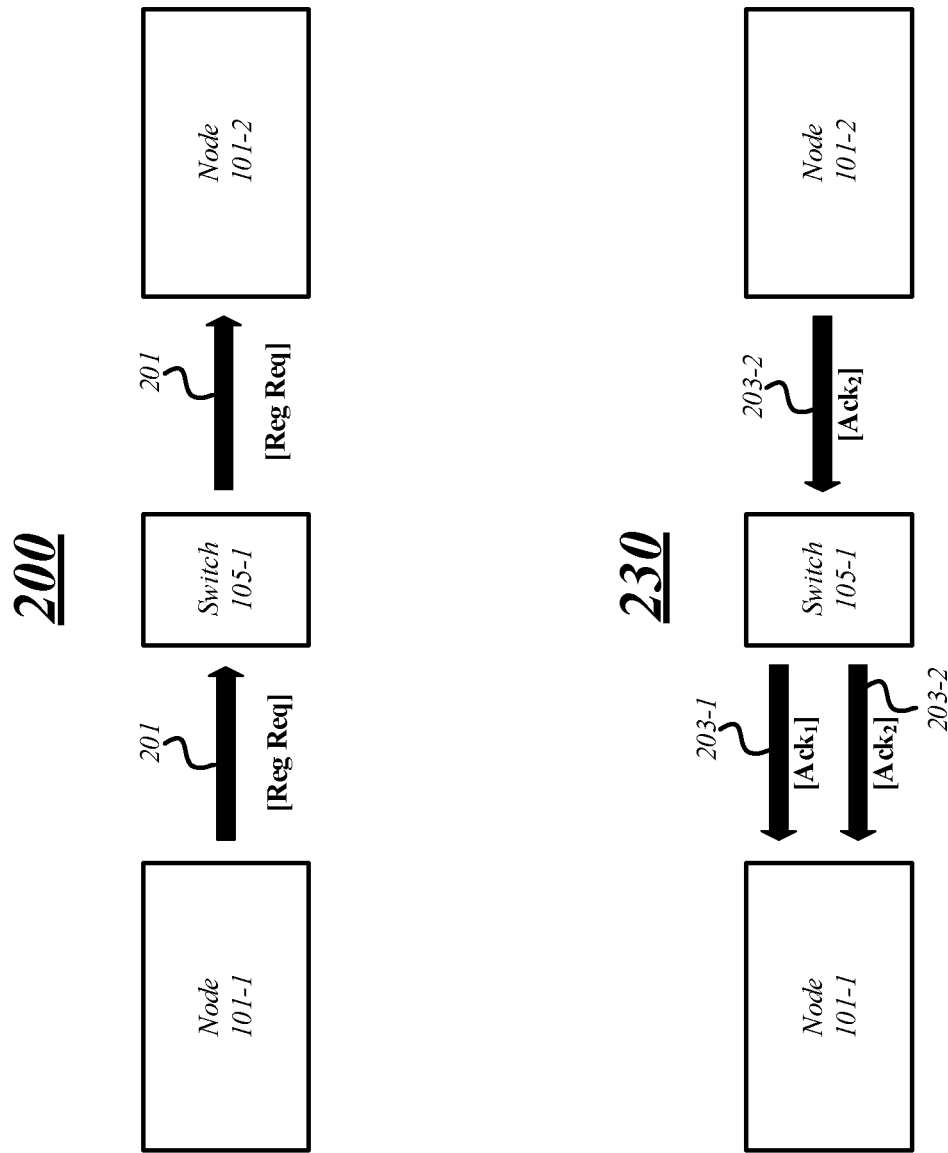
FIG. 2A illustrates an example of a communication flow diagram.

FIG. 2A illustrates an example communication flow 200 to register one or more resources of an end-to-end path for an application. FIG. 2A also illustrates an example communication flow 230 for communication of one or more acknowledgement messages to confirm registration of the one or more resources for monitoring.

Figure 2B:
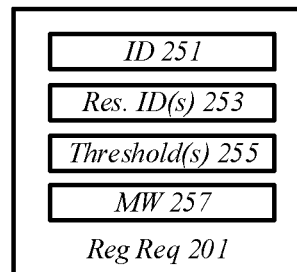
FIG. 2B illustrates example messages.
Figure 2B:
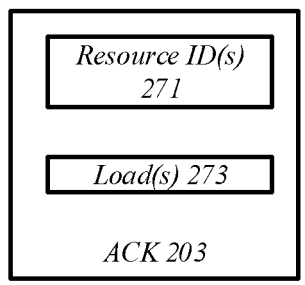

In the illustrated flow 200, a first node 101-1 may communicate a registration request message 201 to register one or more resources of the switch 105-1 and a second node 101-2. The registration request 201 may include information and data to register the resources of these devices to monitor. FIG. 2B illustrates one example of a registration request 201 having an identification field 251 including information to identify the destination node or end-point for the end-to-end path. In the illustrated example, node 101-2 is identified in the identification field 251, for example.

The registration request 201 may also include one or more resource identification fields 253 to include information to identify each resource to monitor. For example, a resource identification field 253 may identify resources, such as the processing circuitry 120, memory 122, and storage 124, of the switch 105-1. In another example, a resource identification field 253 may identify resources, such as the processing circuitry 102-2, memory 104-2, interface(s) 106-2, and storage 108-2, of the node 101-2. Embodiments are not limited in this manner.

The registration request 201 also includes one or more threshold value fields 255 to include threshold information or threshold values for each of the resources identified. The threshold information may be used by the monitoring device, e.g. the switch 105-1 or the node 101-2, to determine whether a resource is over-utilized or is not meeting the QoS requirements for the application 103-1 of the node 101-1. In some instances, the threshold information or value may be set for a resource such that an action or a correction occurs prior to the resource being over-utilized. For example if a resource is over utilized at sixty percent (60%), the threshold value may be set to forty-percent (40%). Embodiments are not limited to this example.

The threshold information may include a usage percentage value or an actual value for each of the resources. For example, a threshold value field 255 may include a usage percentage value or twenty-percent (20%) for the processing circuitry 120 of the switch 105-1. Thus, when the switch 105-1 is not capable of providing 20% of its processing capability to the application 103-1 of node 101-1 (or more than 80% is being used by other applications/nodes 101), the application 103-1 and node 101-1 are notified, as will be discussed in more detail below. In another example, a threshold value field 255 may include 500-gigabyte floating point operations per second (GFLOPS) as a specified requirement for the processing circuitry of the switch 105-1 for the application 103-1 of the node 101-1. In this example, when the switch 105-1 is not capable of providing at least 500 GFLOPS, the application 103-1 and node 101-1 are notified.

The registration request 201 may also include a monitoring window field 257 specifying an amount of time to calculate an average load for each of the one or more resources. The amount of time may be any amount of time and selected by logic based on QoS requirements, for example. In some instances, the monitoring window or time may be determined based on an interval of burst traffic or resource utilization. The monitoring window may prevent inadvertent changes of resource utilization in "corner cases" in which the length of a burst of usage is exactly or near exactly the length of a predefined interval.

FIG. 2A illustrates flow 200 sending one registration request 201 to register each of the resources of the switch 105-1 and the node 101-2. More specifically, a single registration 201 may be sent over the whole end-to-end path including any number of switches 105 and other devices (not shown) to register all of the resources involved in the end-to-end path. As mentioned, the request identifies the destination node or end-point. If there are one or more switches, routers, traffic buffering entities between the sending node and the destination node, the registration request 201 may be copied and repeated along the end-to-end path. However, embodiments are not limited in this manner. For example, the node 101-1 may send a different registration request 201 to each of the switch 105-1 and the node 101-2.

In some embodiments, a node 101 may register the same end-to-end path more than one time. For example, the node 101-1 may communicate another registration request 201 to the node 101-2. The second registration request 201 may identify different resources to monitor, provide different threshold values, different monitoring window, or a combination thereof. The same end-to-end path may be registered any number of times and embodiments are not limited in this manner.

In embodiments, multiple end-to-end paths may be monitor between different nodes 101. For example, the node 101 may communicate a registration request 201 to multiple nodes 101 or end-points by utilizing a wildcard as a destination node identified in the destination identification field 251. A wildcard may be any symbol or alphanumeric character that can be used to identify more than one node 101 or end-point as a destination node.

As illustrated in flow 230 of FIG. 2A, each device, e.g. switch 105 and node 101-2, may respond to the registration request 201 with acknowledgement (ACK) messages 203-1 and 203-2, respectively, indicating that each resource is successfully registered to monitor. In the case where one or more resources fail to be registered, a device may communicate a non-acknowledgement (NACK) message. Appropriate action may be taken if a resource is not registered, as will be discussed in more detail below.

FIG. 2B illustrates an example acknowledgement message 203 to indicate one or more resources are successfully registered to monitor. The acknowledgement message 203 may include one or more resource identification field(s) 271 and one or more load fields 273. Each of the resource identification field(s) 271 may identify a resource. For example, the resource identification field 271 can include information, such as any symbol and/or alphanumeric character, or combination thereof, to uniquely identify a resource. Each of the load fields 273 includes information to specify a usage load for a specified resource. The load field 273 may include a percentage or an actual amount of usage, e.g. 50% or 500 GFLOPS. Moreover, and in some embodiments, the load field 273 may include an indication of which resource the usage load is associated. Embodiments are not limited in this manner.

In embodiments, each device may respond or communicate an acknowledgement message 271 on a semi-periodic, non-periodic, and periodic basis. For example, a device may communicate an acknowledgement message 271 after every monitoring window. In the same or other instances, a device may communicate an acknowledgement message 271 when a resource is not meeting a threshold requirement. For example, the acknowledgement message 271 may be communicated when a load determination indicates a resource cannot provide a specified load. The indication may be based on the determined load indicating resource usage availability for the node 101-1 is below a threshold value. Alternatively, the indication may be based on the determined load indicating the resource usage for other nodes, e.g. not node 101-1, is above a threshold value, indicating that there is not enough available usage for the node 101-1. Embodiments are not limited in this manner.

The acknowledgement message 271 may be communicated to the node 101-1 in an active manner or passive manner. For example, node 101-2 may communicate the acknowledgement message 271 in an active manner by sending the message directly to an application, causing a software interrupt, and so forth. The node 101-2 may communicate the acknowledgement message 271 in a passive manner by writing information of the acknowledgement message 271 in a polled location of memory or storage, for example. The application of node 101-1 may then poll the location depending on need.

Figure 1C:
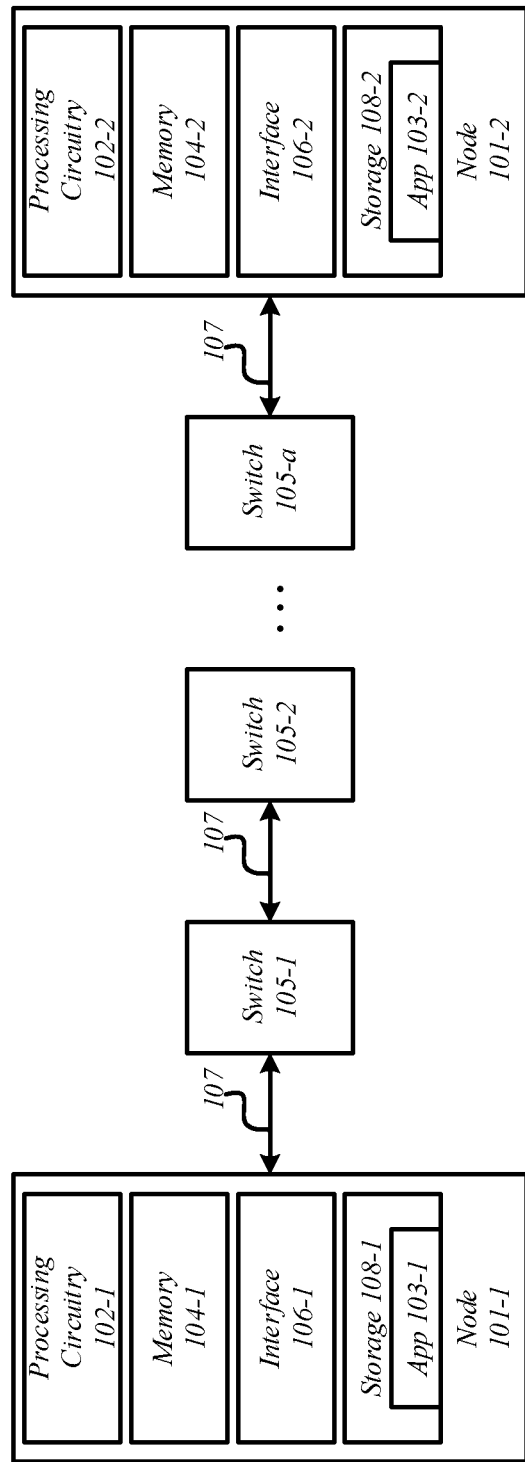
FIG. 1C illustrates an example of a system.
Figure 3A:
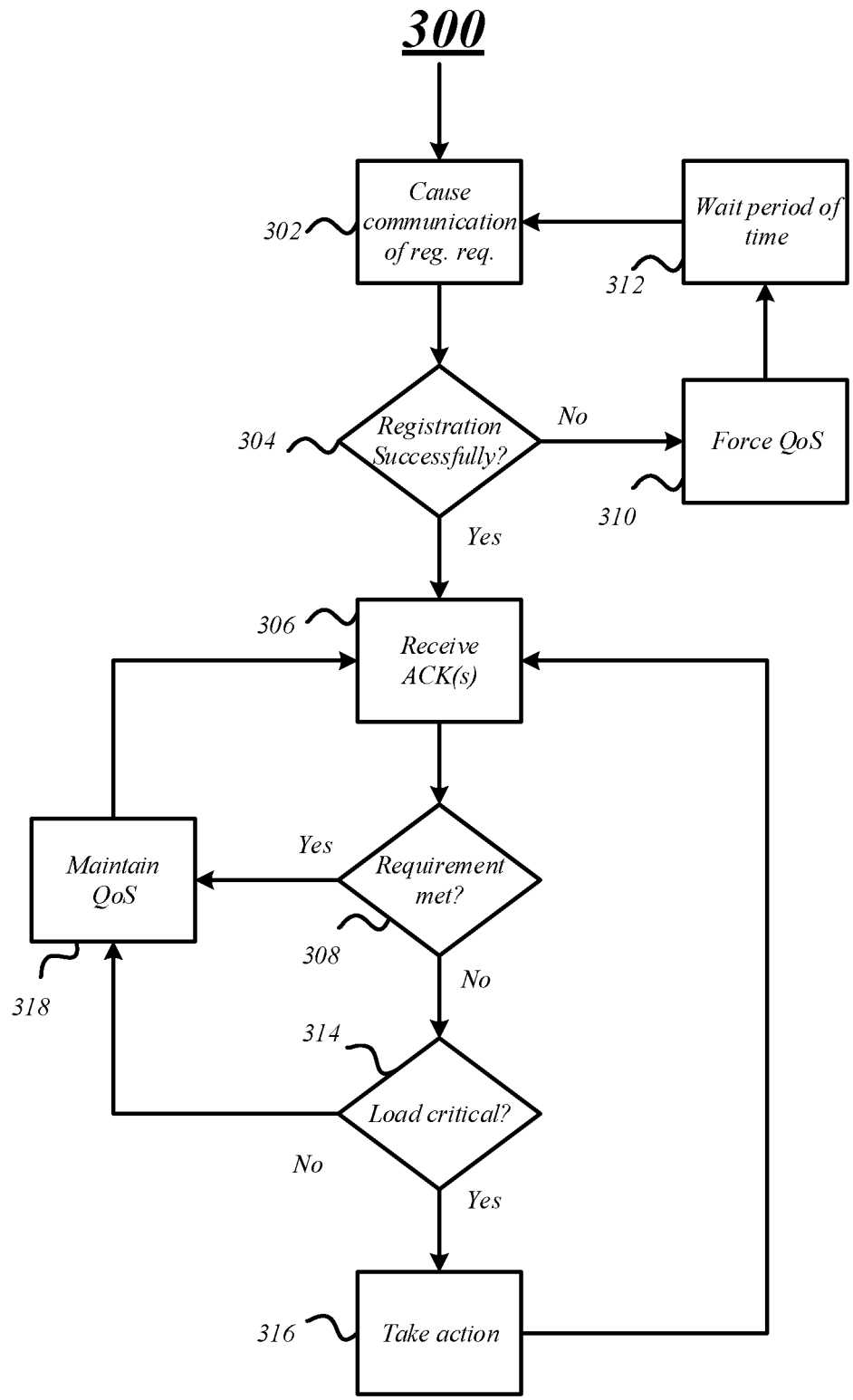
FIG. 3A illustrates an example of a logic flow diagram.

FIG. 3A illustrates an example of a first logic flow 300 for processing in a computing environment. The logic flow 300 may be representative of some or all of the operations executed by one or more embodiments described herein. For example, the logic flow 300 may illustrate operations performed by a node 101, as illustrated in FIGS. 1A-1C. A node 101 may include processing circuitry and logic to perform one or more operations discussed herein, for example. Moreover, one or more operations may be included in hardware only, software only, or a combination thereof. For example, one or more operations discussed herein may be performed by a software stack in a node of a data center or supercomputer array.

At block 302, the logic flow 300 may include causing a communication of a registration request to one or more other devices, e.g. nodes, switches, fabric devices, fabric interfaces, etc. For example, the registration request may be communicated from a sending node to a destination node via one or more switches, e.g. the end-to-end path. As previously discussed, the registration request may identify the destination node, which may be used by the one or more switches to route the registration request to the proper destination node. The registration request may cause devices of the end-to-end path to register one or more resources that may also be identified in the registration request. These resources may be monitored by their respective devices and communicate information to the sending node (software stack) to ensure that they are meeting the needs of sending node and an application thereon.

In some instances, the registration request may be based on an instruction exposed by an interface, such as an HFI, that may be used by the software stack to send the registration request when monitoring of resources is desired or required. The registration request may also include threshold requirements for each of the resources to be monitored. A threshold requirement may be a percentage or amount of usage required by the resource to meet the needs of the application, for example.

The logic flow 300 may include determining whether the registration of each resource was successful or not successful at block 304. For example, a device may communicate a NACK message indicating that at least one of its resources cannot be registered to monitor to the sending node of the registration request. Alternatively, if every resource is successfully registered for a device, a ACK message, e.g. ACK message 203, may be communicated back to the sending node of the registration request.

If the registration of a least one resource is not successful at block 304, embodiments may include performing an action including forcing a QoS scheme for the end-to-end path and resources at block 310. For example, resource utilization may be reserved for each resource of the end-to-end path to meet the needs of the sending node and application, e.g. a guaranteed resource utilization QoS scheme. However, embodiments are not limited in this manner and other QoS schemes may be forced at block 310.

At block 312, the logic flow 300 may include waiting a period of time and sending an additional registration request for the end-to-end path to attempt to register the resources. This process may be repeated any number of times until the resources are registered or until the sending node and application no longer need the resources.

If the registration of the resources is successful at block 304, the logic flow 300 may include receiving one or more ACK messages, e.g. ACK message 201, indicating the resources are successfully registered and a load for each of the resources at block 306. The ACK message may be communicated from each of the devices including the resources monitored. In some instances, an ACK message from a destination node may be forwarded or communicated to the sending node via one or more switches or other fabric infrastructure, for example. As previously discussed, an ACK message may be communicated upon successful registration of the resources for load monitoring. Further, one or more ACK messages may be communicated on one or more of a non-periodic basis (when a requirement is not being met or usage falls below a threshold value), on a semi-periodic basis, and on a periodic basis (after each monitoring window).

In some embodiments, ACK messages may be communicated with hysteresis when communicated on a non-periodic basis. For example, if a threshold value is set to alert based on the threshold value at 40% utilization, the ACK message may be sent at some point higher than 40%, and after some time for which it has remained at or above the point higher than 40%. Similarly, when a load dissipates and utilization falls below the 40% threshold value an ACK message may be given after some point lower than 40%, and after some time for which it has remained at or below the point lower than 40%.

At decision block 308, the logic flow 300 may include determining whether a load or usage requirement for the application is being met by a resource. In some instances, the determination is based on the load value indicating in the ACK message received by the sending node and application. The load value may indicate an amount or percentage of load/usage for a particular resource. In some instances, the load value may include an amount or percentage of usage of the resource by other nodes. Thus, the sending node may determine an amount or percentage of usage available to its application. Alternatively, the load value in the ACK message may include a maximum amount or percentage of usage available to the sending node and application. Embodiments are not limited in this manner.

If the load requirement of the application is being met by the resource at block 308, embodiments may include maintaining the current QoS scheme for the application at block 318. For example, information may be processed by the resources of the end-to-end path for the application under a "best effort" QoS scheme or a "differentiated processing/traffic" QoS scheme. Note that if the current QoS scheme includes reserving resource usage or load, the current QoS scheme may be lowered to a more relaxed scheme, e.g. "best effort" or "differentiated processing." Thus, additional resource usage may be made available to other nodes.

If the load requirement of the application is not being met by the resource at block 308, embodiments may include determining whether the load for the application is critical or not critical at block 314. A critical load for an application would be replication data for remote storage, for example. This data may be used in high availability systems with stringent QoS requirements. On the other hand, an example of a non-critical application may be an application that is accessing and processing remote storage and doing analytics on that remote data. If, at block 314, the load is not critical, the QoS scheme may be maintained or lowered to a more relaxed QoS scheme at block 318. If the load is critical at block 314, an action may be taken to correct or ensure that the resource is reserved for the sending node and application at block 316. For example, the QoS scheme may be change to reserve usage or bandwidth for the application on the resource. In some instances, the QoS scheme may affect each resource in the end-to-end path or only those resources that are not meeting the load requirements for the application in the end-to-end path.

In some instances, to reserve additional usage or load for an application at block 314, the sending node and/or application may communicate information to a device having the over utilized resource to change the QoS scheme. For example, information may be communicated to the device to reserve the usage or load on the resource. In embodiments, the logic flow 300 may continue to monitor the resources for the end-to-end path until the resources are no longer needed, e.g. by sending a deregistration message.

Figure 3B:
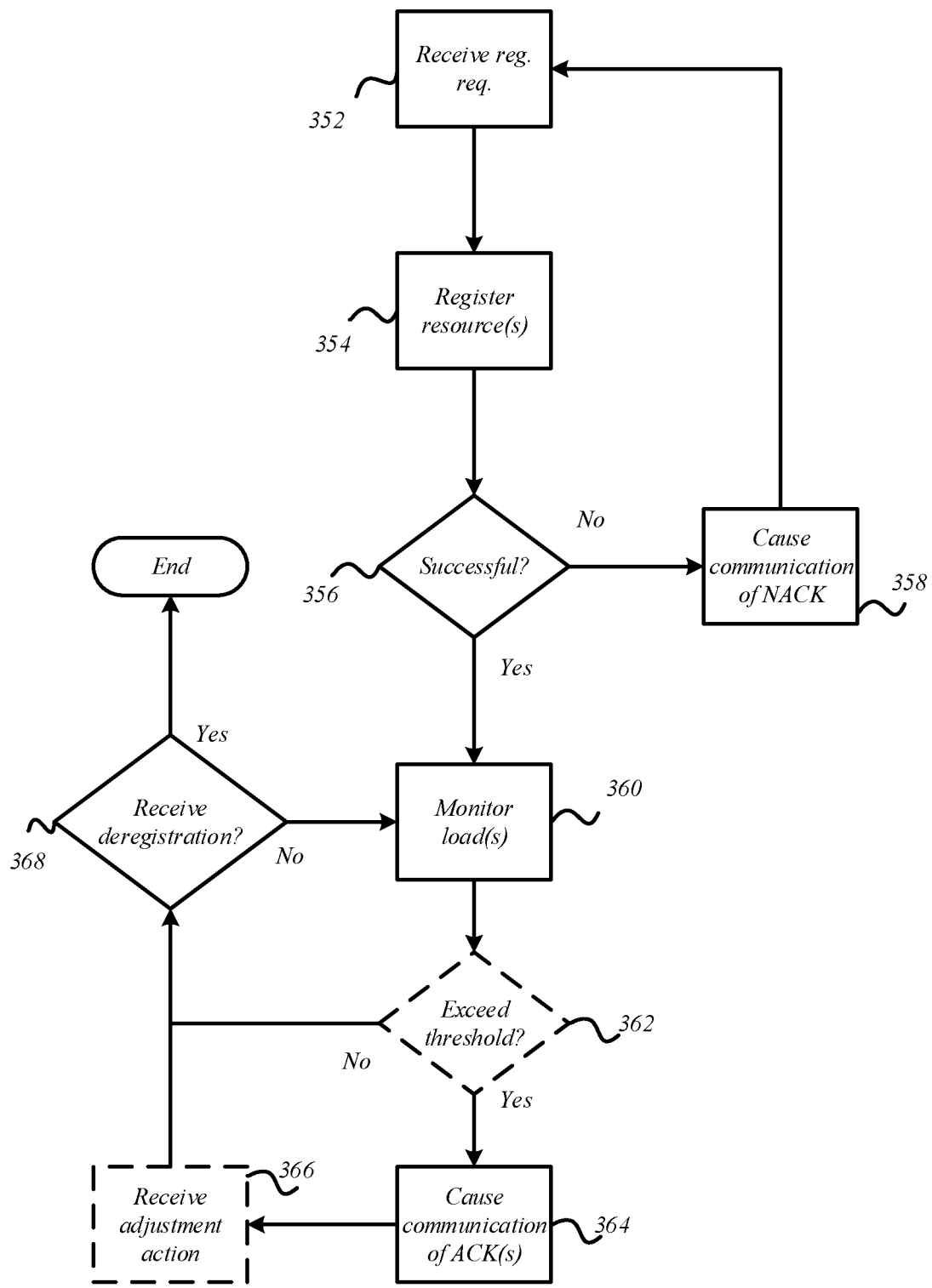
FIG. 3B illustrates an example of a second logic flow diagram.

FIG. 3B illustrates an example of a second logic flow 350 for processing in a computing environment. The logic flow 350 may be representative of some or all of the operations executed by one or more embodiments described herein. For example, the logic flow 360 may illustrate operations performed by a node 101 or switch 105, as illustrated in FIGS. 1A-1C. For example, node 101 or switch 105 may include processing circuitry and logic to perform one or more operations discussed herein. Moreover, one or more operations may be included in hardware only, software only, or a combination thereof. For example, one or more operations discussed herein may be performed by a software stack in the node 101 or switch 105. Embodiments are not limited in this manner.

At block 352, the logic flow 350 includes receiving a registration request. For example, a switch or a destination node may receive a registration request to register one or more resources to monitor load or usage. The registration request may include a destination identification, one or more resource identifiers, one or more threshold values, and a monitor window, as illustrated and discussed with respect to FIGS. 2A and 2B.

At block 354, the logic flow 350 includes registering one or more resources to monitor for a sending node and application. Registering a resource to monitor may include enabling logic in a node or switch to monitor the resource. For example, loads may be determined or monitored by software, hardware, or a combination of both. In some instances, an operating system may provide the load information to the software stack. In the same or other instances, a hardware element may provide the load information to the software stack. For example, processing circuitry, memory, and interfaces may include hardware circuitry, e.g. "health sensors," to monitor and determine loads or usage. In another example, one or more registers may store load values or information for the resources. In a specific example, each ingress and egress queue of a switch may have a register in which load information can be stored. The load information may be communicate to the software stack of the node or switch to compare with a threshold value set from the registration request for the resource. The software stack may alert, e.g. send an ACK message, the sending node based on the comparison, e.g. if the processing load exceeds the threshold value.

At decision block 356, the logic flow 350 includes determining whether the registration of the one or more resources was successful or not successful. If the registration is not successful, a NACK message may be communicated to the sending node at block 358. The NACK message may include information, such as resource identification, switch or node identification, and so forth, to enable the sending node and application to determine which resource cannot be registered. In some instances, the NACK message may include an "error report" to identify the cause or reason why the resource cannot be registered. Embodiments are not limited in this manner.

At block 360, embodiments include monitoring loads for each of the one or more resources. As previously discussed, logic may include comparing load information for a resource with a threshold value for the resource to determine whether the resource is meeting the QoS requirements for an application. For example, if the load is greater (or equal to) the threshold value, the resource may not be able to meet the load requirements for the application to utilize the resource. The load information may indicate which of the other nodes are utilizing the resource and the maximum available load for utilization a resource can provide. In some instances, the load information may be provided to logic for comparison in real-time or a continuous or semi-continuous basis, e.g. every microsecond, millisecond, or any other time that may be stipulated by the application based on an SLA, for example.

In some embodiments, a determination as to whether the load usage of the resource exceeds (or meets) the threshold value for the resource indicating the resource cannot provide the load requirements for the application at block 362. For example, the load information determined at 360 may indicate that other nodes are using the resource above (or equal) to the threshold value provided in the registration request. In this example, the threshold value may be minimum amount (or percentage) of load required by the application for the resource. Note that in some embodiments; the opposite logic may be used to indicate the resource cannot or is not providing the required load for the application. For example, if the information determined at block 360 indicates the maximum amount of load that can be utilized by the application on the resource is below the threshold value, the resource cannot meet the requirements of the application. Embodiments are not limited in this manner.

At block 364, the logic flow 350 includes sending an acknowledgement message indicating a load usage for a resource. In some instances, the ACK message may only be sent when the resource cannot provide the required load for the application. In other instances, the ACK message may be communicated on a periodic or semi-periodic basis regardless of whether the resource can provide the load for the application or not.

In some embodiments, the logic flow 350 may include receiving an adjustment action at block 366. The adjust action may be communicated or sent based on the resource not meeting the requirement of the application. The adjustment action may make one or more adjustments to the device (or elsewhere in the end-to-end path) to enable the resource to meet the load requirements for the application. For example, the adjustment action may cause a device to reserve load usage for the application. In another example, the adjustment action may cause information and data for other nodes to be processed by a different node or switch. Embodiments are not limited in this manner and other adjustment actions may be taken.

At decision block 368, a determination may be made as to whether a deregistration message is received by the sending node and application. If a deregistration message was not received, the device might continue to monitor resources for the application. However, if a deregistration message was received, the logic flow 350 may end.

Figure 4:
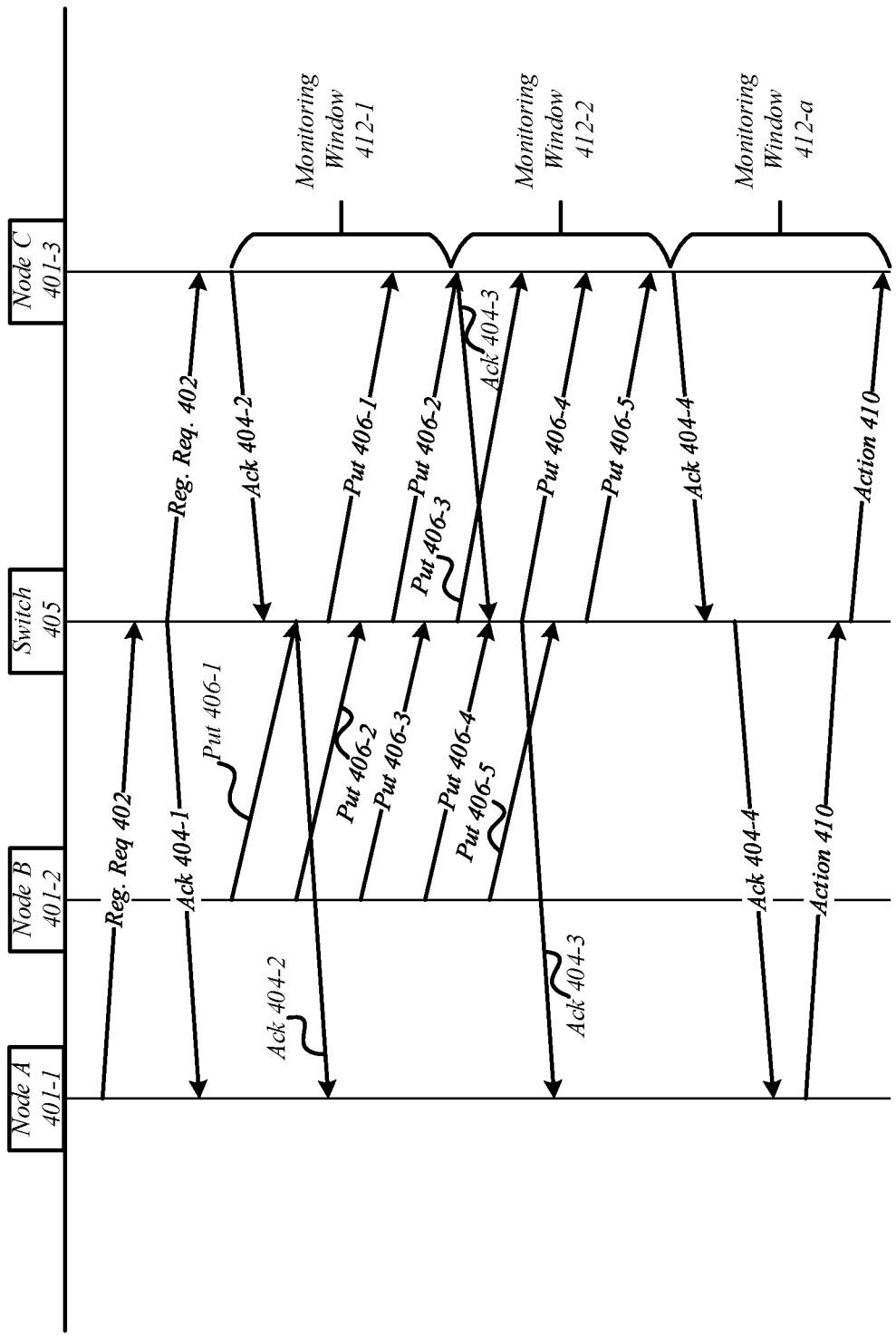
FIG. 4 illustrates an example of a second communication flow diagram.

FIG. 4 illustrates an example of a communications flow 400 to register one or more resources for monitoring. As previously discussed, a node may communicate a registration request to register one or more resources of an end-to-end path to ensure that each of the resources is provide usage or load capabilities in accordance with an application of the node. In the illustrate example of FIG. 4, node A 401-1 communicates a registration request 402 to node C 401-1 via switch 405. The registration request 402 may be the same as or similar to the registration request previously discussed. For example, the registration request 402 may include a destination identifier that identifies node C 401-3 as the destination node. Thus, in this example, the switch 405 may use this information to route the registration request 402 to the node C3 401-3.

The registration request 402 also includes one or more resource identifiers and threshold values to enable the switch and the node C 401-3 to register for load monitoring. The registration request 402 can also include a monitoring window value to determine an average load for a resource. The monitoring window value may be an amount of time over which the average load for the resource is determined, for example. FIG. 4 illustrates monitoring windows 412-1 through 412-$a$, where a can be any positive integer.

Each of the devices, e.g. switch 405 and Node C 401-3, may respond to the registration request 402 by communicating an acknowledgement message to node A 401-1. For example, switch 405 communicates acknowledgement message 404-1 and node C 401-3 communicates acknowledgement message 404-2 to node A 404-1 in response to the registration request 402. Each of the acknowledgement messages 404-1 and 404-2 may include an indication that their respective resources are successful enabled for monitoring. The acknowledgement messages 404-1 and 404-2 may also indicate or include one or more load values to indicate a current load for their resources. Acknowledgement messages 404-1 and 404-2 may indicate that the loads of switch 405 and node C 401-3 resources is below the threshold requirement for node A 401-1.

In the illustrated example, node B 401-2 may commence sending one or more jobs, such as puts 406-1 through 406-5, to node C 401-3 for processing. These jobs may use the resources of the switch 405 and the node C 401-3. Node C 401-3 may determine an average load or usage for registered resources during the monitoring window 412-1 and communicate an acknowledgement message 404-3 to node A 401-1. In the illustrated example, only two puts 406-1 and 406-2 are sent to node C 401-3 for processing during the first monitoring window 412-1. Thus, the loads of the resources of node C 406-3 may still be under the threshold values or requirements stipulated by node A 401-1.

Node B 401-2 may continue to send jobs to node C 401-3. Again, after monitoring window 412-2, node C 401-3 may determine the average load or usage of its resources being monitored and communicate the information to node A 401-1. In this example, puts 406-3 through 406-6 may cause the average load to exceed the threshold value for resources of node C 401-3 during the second monitoring window 412-2. Node C 401-3 may communicate acknowledgement 404-4 to node A 401-1 with the results of the average load determination after monitoring window 412-2. In this example, node A 401-1 may communicate or cause one or more actions 410 on node C 401-3 to ensure that the resources are reserved for node A 401-1. Embodiments are not limited to the example illustrated in FIG. 4.

Figure 5:
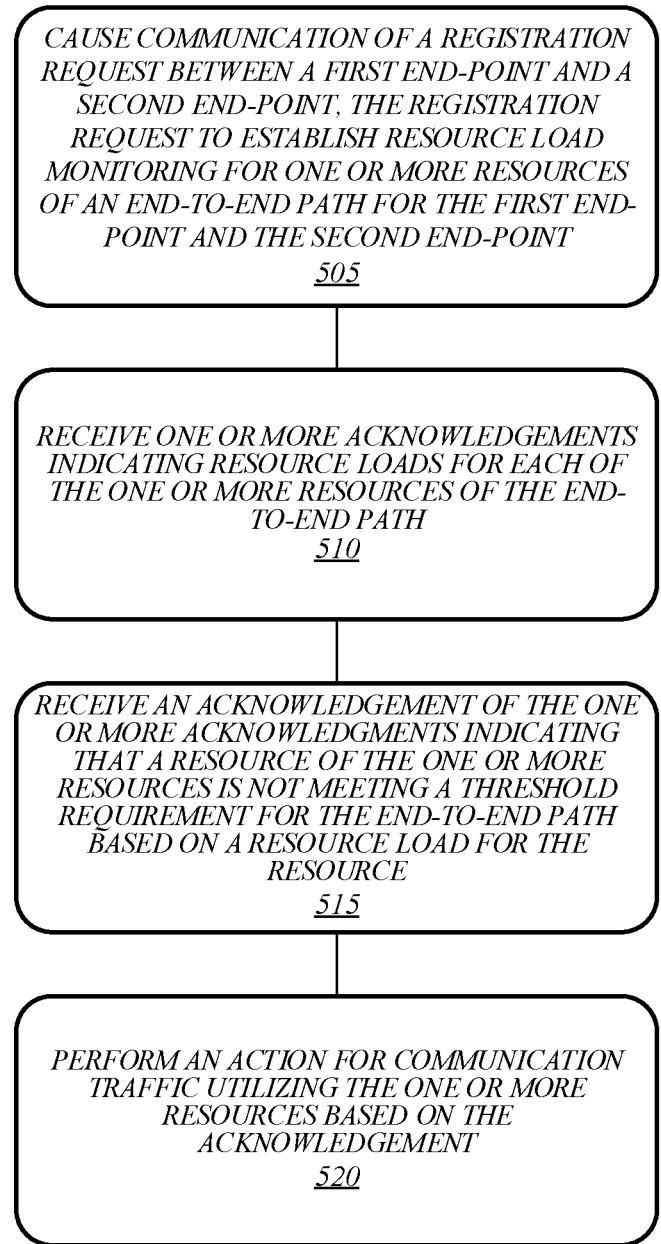
FIG. 5 illustrates an example of a third logic flow diagram.

FIG. 5 illustrates an embodiment of a logic flow diagram 500. The logic flow 500 may be representative of some or all of the operations executed by one or more embodiments described herein. For example, the logic flow 500 may illustrate operations performed by one or more systems or devices in FIGS. 1A-1C. Various embodiments are not limited in this manner.

In various embodiments, logic flow 500 may include causing communication of a registration request between a first end-point and a second end-point, the registration request to establish resource load monitoring for one or more resources of an end-to-end path for the first end-point and the second end-point at block 505. For example, a sending node may communicate the registration request to a destination node via one or more switches, as previously discussed. The end-to-end path can include one or more resources of the sending node, destination node, and the one or more switches to communicate the registration request and subsequent jobs and instructions.

At block 510, the logic flow 500 includes receiving one or more acknowledgements indicating resource loads for each of the one or more resources of the end-to-end path. Further and at block 515, the logic flow 500 includes receiving an acknowledgement of the one or more acknowledgments indicating that a resource of the one or more resources is not meeting a threshold requirement for the end-to-end path based on a resource load for the resource.

The logic flow 500 includes performing an action for communication traffic utilizing the one or more resources based on the acknowledgement at block 520. Embodiments are not limited in this manner. For example, embodiments include reserving resource utilization on the one or more resources for use by an application on the first end-point. Embodiments are not limited in this manner.

Figure 6:
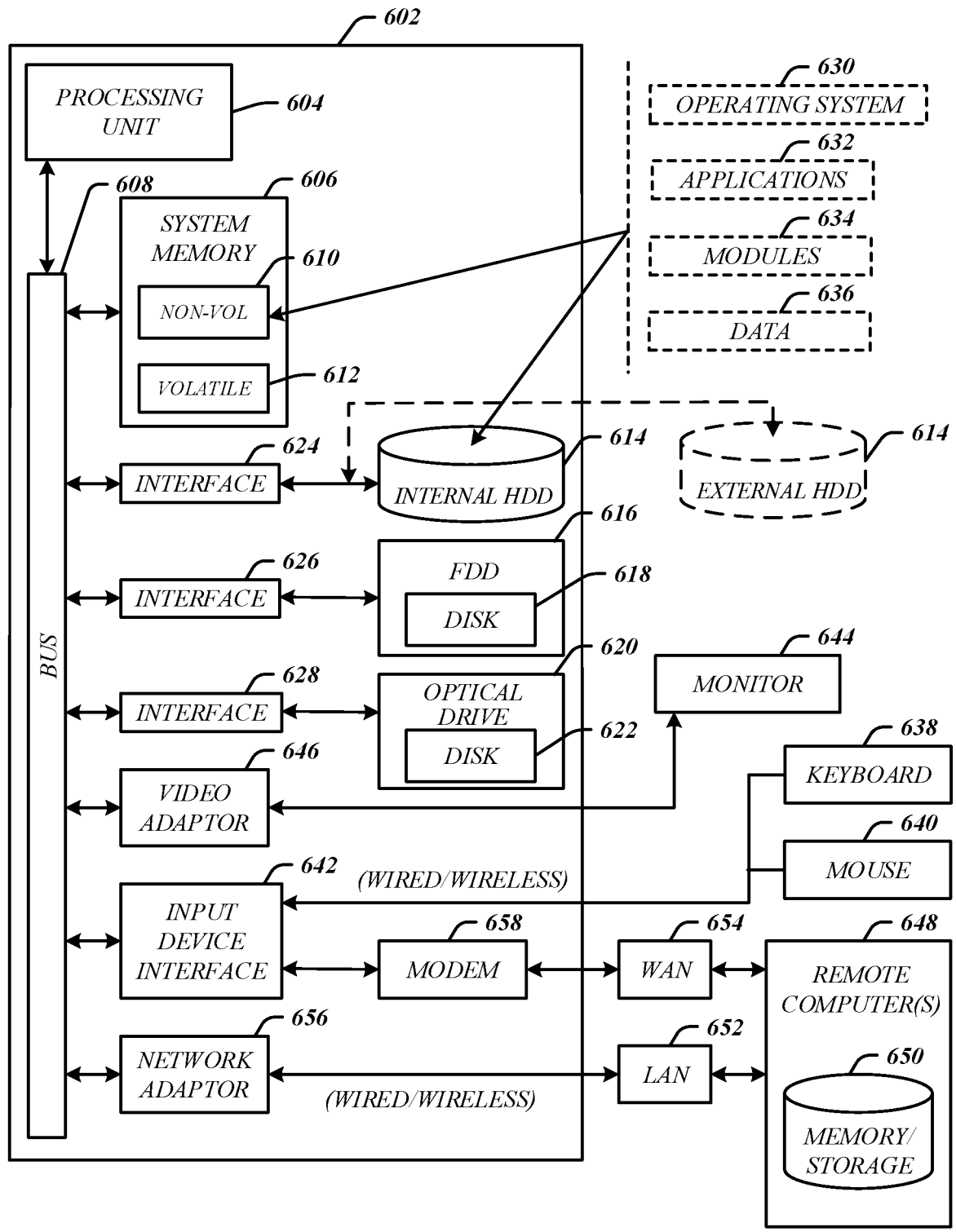
FIG. 6 illustrates an example of a computer architecture.

FIG. 6 illustrates an embodiment of an exemplary computing architecture 600 suitable for implementing various embodiments as previously described. In one embodiment, the computing architecture 600 may comprise or be implemented as part one or more systems and devices previously discussed.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the processing circuitry shown in FIG. 1A.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 105.

A user can enter commands and information into the computer 602 through one or more wired/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements and components as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus may include one or more send a registration request between a first end-point and a second end-point of an end-to-end path, the registration request to establish resource load monitoring for one or more resources of the end-to-end path, receive one or more acknowledgements indicating resource loads for each of the one or more resources of the end-to-end path, at least one of the acknowledgements to indicate a resource of the one or more resources is not meeting a threshold requirement for the end-to-end path, and perform an action for communication traffic utilizing the one or more resources based on the acknowledgement.

In a second example and in furtherance of the first example, a system, device, apparatus may include the registration request comprising resource identifiers to identify each of the one or more resources.

In a third example and in furtherance of any previous example, a system, device, apparatus may include the registration request comprising threshold values for each of the one or more resources.

In a fourth example and in furtherance of any previous example, a system, device, apparatus may include the registration request comprising a monitor window value to define a period of time to determine an average resource load for each of the one or more resources.

In a fifth example and in furtherance of any previous example, a system, device, apparatus may include the one or more resources comprising at least one of a memory of the first end-point, a processing component of the first end-point, an interface of the first end-point, a switch fabric, an interface of the second end-point, a processing component of the second end-point, and a memory of the second end-point.

In a sixth example and in furtherance of any previous example, a system, device, apparatus may include logic to determine whether the communication traffic is critical communication traffic or not critical communication traffic, perform the action comprising reserving one or more of additional network bandwidth, additional processing cycles, and additional memory usage for the communication traffic if the communication traffic is critical communication traffic, and perform the action comprising maintaining current usage of network bandwidth, processing cycles, and memory for the communication traffic if the communication traffic is not critical communication traffic.

In a seventh example and in furtherance of any previous example, a system, device, apparatus may include logic to send a second registration request between the first end-point and the second end-point, the second registration request to establish other resource load monitoring for the one or more resources for the end-to-end path, the other resource load monitoring to have different threshold requirements than the threshold requirements for the resource load monitoring.

In an eighth example and in furtherance of any previous example, a system, device, apparatus may include logic to send a second registration request between the first end-point and the second end-point, the second registration request to establish other resource load monitoring for the one or more resources for the end-to-end path, the other resource load monitoring to have a different monitor window value than a monitor window value for the resource load monitoring.

In a ninth example and in furtherance of any previous example, a system, device, apparatus may include logic to establish resource load monitoring for one or more resources of another end-to-end path for the first end-point and the second end-point, wherein at least one resource of the other end-to-end path is different than one resource of the end-to-end path.

In a tenth example and in furtherance of any previous example, a system, device, apparatus may include logic to receive a negative acknowledgement indicating the resource load monitoring for at least one of the one or more resources failed to establish.

In an eleventh example and in furtherance of any previous example, a system, device, apparatus may include the resource load monitoring to set a resource load monitor for each of the one or more resources based on threshold requirement values of the registration request.

In a twelfth example and in furtherance of any previous example, a system, device, apparatus may include logic to send a deregistration request between the first end-point and the second end-point to cancel the resource load monitoring for the one or more resources of the end-to-end path.

In a thirteenth example and in furtherance of any previous example, a computer-readable storage medium comprising a plurality of instructions that, when executed by processing circuitry, enable processing circuitry to send a registration request between a first end-point and a second end-point of an end-to-end path, the registration request to establish resource load monitoring for one or more resources of the end-to-end path, receive one or more acknowledgements indicating resource loads for each of the one or more resources of the end-to-end path, at least one of the acknowledgements to indicate a resource of the one or more resources is not meeting a threshold requirement for the end-to-end path, and perform an action for communication traffic utilizing the one or more resources based on the acknowledgement.

In a fourteenth example and in furtherance of any previous example, a computer readable storage medium comprising a plurality of instructions, that when executed, enable processing circuitry to perform the action comprising reserving one or more of additional network bandwidth, additional processing cycles, and additional memory usage for the communication traffic if the communication traffic is critical communication traffic, perform the action comprising maintaining current usage of network bandwidth, processing cycles, and memory for the communication traffic if the communication traffic is not critical communication traffic.

In a fifteenth example and in furtherance of any previous example, a computer readable storage medium comprising a plurality of instructions, that when executed, enable processing circuitry to send a second registration request between the first end-point and the second end-point, the second registration request to establish other resource load monitoring for the one or more resources for the end-to-end path, the other resource load monitoring to have different threshold requirements than the threshold requirements for the resource load monitoring.

In a sixteenth example and in furtherance of any previous example, a computer readable storage medium comprising a plurality of instructions, that when executed, enable processing circuitry to send a second registration request between the first end-point and the second end-point, the second registration request to establish other resource load monitoring for the one or more resources for the end-to-end path, the other resource load monitoring to have a different monitor window value than a monitor window value of the resource load monitor.

In a seventeenth example and in furtherance of any previous example, a computer readable storage medium comprising a plurality of instructions, that when executed, enable processing circuitry to establish resource load monitoring for one or more resources of another end-to-end path for the first end-point and the second end-point, wherein at least one resource of the other end-to-end path is different than one resource of the end-to-end path.

In an eighteenth example and in furtherance of any previous example, a computer readable storage medium comprising a plurality of instructions, that when executed, enable processing circuitry to receive a negative acknowledgement indicating the resource load monitoring for at least one of the one or more resources failed to establish.

In a nineteenth example and in furtherance of any previous example, a computer readable storage medium comprising a plurality of instructions, that when executed, enable processing circuitry to send a deregistration request between the first end-point and the second end-point to cancel the resource load monitoring for the one or more resources of the end-to-end path.

In a twentieth example and in furtherance of any previous example, a computer-implemented method may include sending a registration request between a first end-point and a second end-point of an end-to-end path, the registration request to establish resource load monitoring for one or more resources of the end-to-end path, receiving one or more acknowledgements indicating resource loads for each of the one or more resources of the end-to-end path, at least one of the acknowledgements to indicate a resource of the one or more resources is not meeting a threshold requirement for the end-to-end path, and performing an action for communication traffic utilizing the one or more resources based on the acknowledgement.

In a twenty-first example and in furtherance of any previous example, a computer-implemented method may include performing the action comprising reserving one or more of additional network bandwidth, additional processing cycles, and additional memory usage for the communication traffic if the communication traffic is critical communication traffic, and performing the action comprising maintaining current usage of network bandwidth, processing cycles, and memory for the communication traffic if the communication traffic is not critical communication traffic.

In a twenty-second example and in furtherance of any previous example, a computer-implemented method may include sending a second registration request between the first end-point and the second end-point, the second registration request to establish other resource load monitoring for the one or more resources for the end-to-end path, the other resource load monitoring to have different threshold requirements than the threshold requirements for the resource load monitoring.

In a twenty-third example and in furtherance of any previous example, a computer-implemented method may include sending a second registration request between the first end-point and the second end-point, the second registration request to establish other resource load monitoring for the one or more resources for the end-to-end path, the other resource load monitoring to have a different monitor window value than a monitor window value of the resource load monitoring.

In a twenty-fourth example and in furtherance of any previous example, a computer-implemented method may include establishing resource load monitoring for one or more resources of another end-to-end path for the first end-point and the second end-point, wherein at least one resource of the end-to-end path is different than one resource of the other end-to-end path.

In a twenty-fifth example and in furtherance of any previous example, a computer-implemented method may include sending a deregistration request between the first end-point and the second end-point to cancel the resource load monitoring for the one or more resources of the end-to-end path.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
processing circuitry operable to execute one or more instructions that when executed cause the processing circuitry to:
receive, from a first compute node, a registration request to establish resource load monitoring for one or more resources of an end-to-end path, the end-to-end path to comprise the first compute node, the apparatus, and a second compute node;
receive, from the second compute node, a first acknowledgement to indicate establishment of resource load monitoring at the second compute node; and
send, to the first compute node, the first acknowledgement and a second acknowledgement, the second acknowledgment to indicate establishment of resource load monitoring at the apparatus.

2. The apparatus of claim 1, the processing circuitry operable to execute one or more instructions that when executed cause the processing circuitry to:
receive, from the first compute node, a deregistration request; and
cancel the resource load monitoring for the one or more resources of the end-to-end path based on the deregistration request.

3. The apparatus of claim 1, the processing circuitry operable to execute one or more instructions that when executed cause the processing circuitry to:
receive, from the second compute node, a third acknowledgement to specify resource loads for the one or more resources; and
perform an action for communication traffic of an application utilizing the one or more resources based on the third acknowledgement and a threshold.

4. The apparatus of claim 1, wherein the registration request is to be received via a network interface, the network interface to couple the apparatus to a switch fabric.

5. The apparatus of claim 4, the apparatus to comprise a first switch, the end-to-end path further to comprise a second switch coupled to the switch fabric.

6. The apparatus of claim 1, the one or more resources of the end-to-end path to be provided to an application to be executed on the first compute node, the one or more resources of the end-to-end path to comprise the processing circuitry of the apparatus, processing circuitry of the first compute node, and processing circuitry of the second compute node.

7. The apparatus of claim 6, the end-to-end path further to comprise a storage node coupled to the second compute node, the one or more resources of the end-to-end path further to comprise a storage of the storage node.

8. The apparatus of claim 1, the registration request to comprise an indication of the apparatus, an indication of the second compute node, threshold values for each of the one or more resources, and a monitoring window.

9. The apparatus of claim 1, wherein the registration request is to correspond to an application.

10. The apparatus of claim 1, wherein the registration request is to correspond to a flow.

11. A non-transitory computer-readable storage medium storing instructions that, when executed by processing circuitry of a networking device, cause the processing circuitry to:
receive, from a first compute node, a registration request to establish resource load monitoring for one or more resources of an end-to-end path, the end-to-end path to comprise the first compute node, the networking device, and a second compute node;
receive, from the second compute node, a first acknowledgement to indicate establishment of resource load monitoring at the second compute node; and
send, to the first compute node, the first acknowledgement and a second acknowledgement, the second acknowledgment to indicate establishment of resource load monitoring at the networking device.

12. The computer-readable storage medium of claim 11, storing instructions that when executed, cause the processing circuitry to:
receive, from the first compute node, a deregistration request; and
cancel the resource load monitoring for the one or more resources of the end-to-end path based on the deregistration request.

13. The computer-readable storage medium of claim 11, storing instructions that when executed, cause the processing circuitry to:
receive, from the second compute node, a third acknowledgement to specify resource loads for the one or more resources; and
perform an action for communication traffic of an application utilizing the one or more resources based on the third acknowledgement and a threshold.

14. The computer-readable storage medium of claim 11, wherein the registration request is to be received via a network interface, the network interface to couple the networking device to a switch fabric.

15. The computer-readable storage medium of claim 14, the end-to-end path further to comprise a second networking device coupled to the switch fabric.

16. The computer-readable storage medium of claim 11, the one or more resources of the end-to-end path to be provided to an application to be executed on the first compute node, the one or more resources of the end-to-end path to comprise the processing circuitry of the networking device, processing circuitry of the first compute node, and processing circuitry of the second compute node.

17. The computer-readable storage medium of claim 11, wherein the registration request is to correspond to an application.

18. The computer-readable storage medium of claim 11, wherein the registration request is to correspond to a flow.

19. A method, comprising:
receiving, by a networking device from a first compute node, a registration request to establish resource load monitoring for one or more resources of an end-to-end path, the end-to-end path to comprise the first compute node, the networking device, and a second compute node;

receiving, by the networking device from the second compute node, a first acknowledgement to indicate establishment of resource load monitoring at the second compute node; and sending, by the networking device to the first compute node, the first acknowledgement and a second acknowledgement, the second acknowledgment to indicate establishment of resource load monitoring at the networking device.

20. The method of claim 19, further comprising:

receiving, by the networking device from the first compute node, a deregistration request; and canceling, by the networking device, the resource load monitoring for the one or more resources of the end-to-end path based on the deregistration request.

21. The method of claim 19, further comprising:

receiving, by the networking device from the second compute node, a third acknowledgement to specify resource loads for the one or more resources; and performing, by the networking device, an action for communication traffic of an application utilizing the one or more resources based on the third acknowledgement and a threshold.

22. The method of claim 19, wherein the registration request is to be received via a network interface, the network interface to couple the networking device to a switch fabric, the end-to-end path further comprising a second networking device coupled to the switch fabric.

23. The method of claim 19, the one or more resources of the end-to-end path to be provided to an application to be executed on the first compute node, the one or more resources of the end-to-end path to comprise processing circuitry of the networking device, processing circuitry of the first compute node, and processing circuitry of the second compute node.

24. The method of claim 19, the registration request comprising an indication of the networking device, an indication of the second compute node, threshold values for each of the one or more resources, and a monitoring window.

25. The method of claim 19, wherein the registration request is to correspond to an application.

26. The method of claim 19, wherein the registration request is to correspond to a flow.

* * * * *